United States Patent Office 3,799,806
Patented Mar. 26, 1974

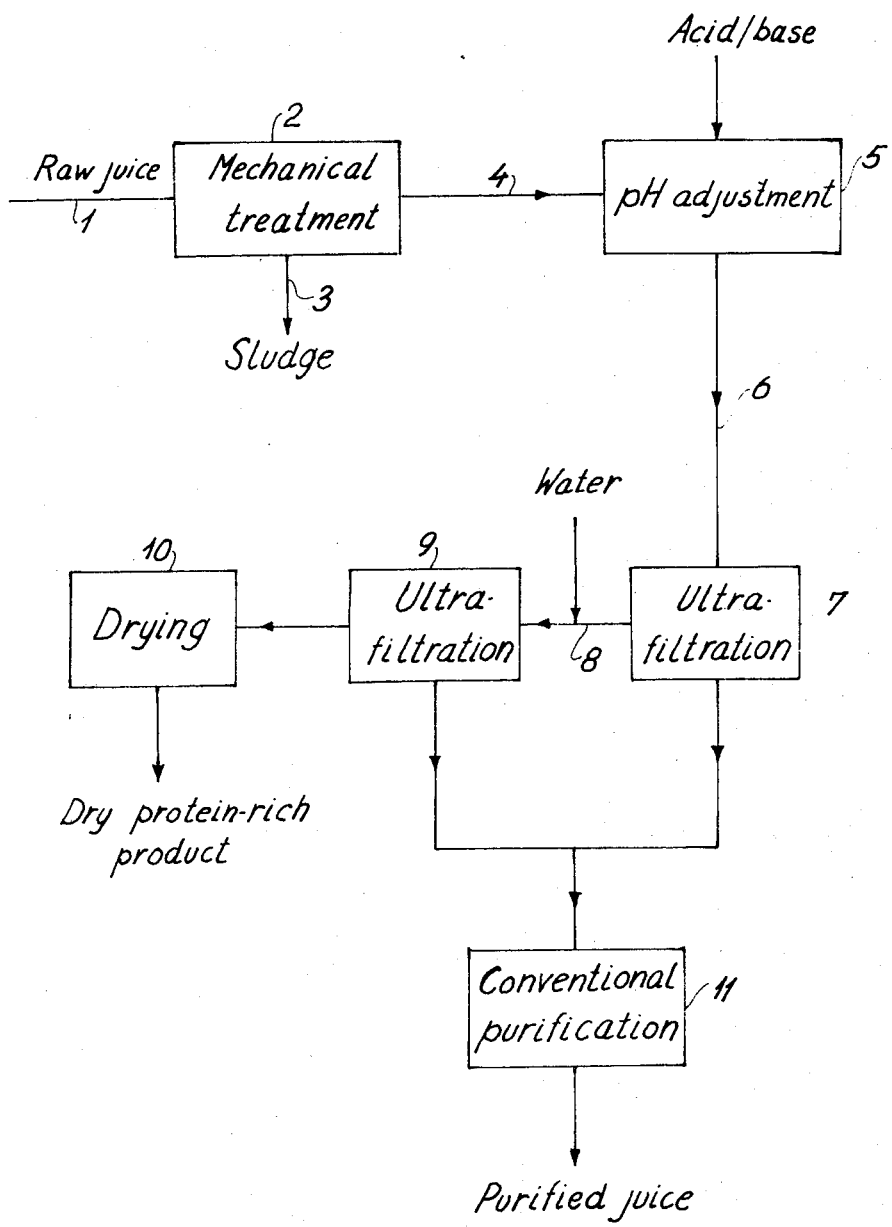

3,799,806
PROCESS FOR THE PURIFICATION AND CLARIFICATION OF SUGAR JUICES, INVOLVING ULTRAFILTRATION
Rud Frik Madsen, Nakskov, Denmark, assignor to Aktieselskabet de Danske Sukkerfabrikker, Copenhagen, Denmark
Filed Apr. 20, 1972, Ser. No. 245,828
Int. Cl. C13d 3/16
U.S. Cl. 127—54         14 Claims

ABSTRACT OF THE DISCLOSURE

A process for the purification and clarification of sugar juice comprising the steps of mechanically separating insoluble materials from the juice, subjecting the juice to a first ultrafiltration, adding water to the concentrate, subjecting the diluted concentrate to a further ultrafiltration, combining the permeates obtained by said ultrafiltrations and subjecting said combined permeates to a final purification.

BACKGROUND OF THE INVENTION

A prior art process for the purification and clarification of sugar juice obtained by the extraction of sugar cane or sugar beets comprises the steps of mixing the sugar juice with lime and subsequently adding carbon dioxide to precipitate the calcium added in the form of calcium carbonate.

Some of the contaminating substances are precipitated together with the calcium carbonate in the form of insoluble or sparingly soluble calcium salts while other contaminants, particularly proteins and pectins, are coprecipitated by physical action. The following purification and clarification comprises a filtration, an additional precipitation and an additional filtration. Many modifications of this purification and clarification process have been used. Thus, part of the sludge formed during the precipitation step may be recycled in order to reduce the expenditures for lime. The lime may also be added at different stages and special apparatuses may be used. Furthermore, the filtration may be replaced by decanting or centrifuging operations.

Juices made from sugar cane are purified and clarified by similar methods but also other methods have been developed. Thus, the addition of lime may be followed by a decanting or centrifuging treatment and sulphur dioxide or phosphoric acid may be added instead of carbondioxide.

In some cases the sugar juice whether made from sugar beets or sugar cane is subjected to an ion exchange treatment following the above mentioned purification and clarification steps. During such an ion exchange treatment remaining contaminating materials are removed.

All these methods suffer from the drawback that part of the high molecular proteins, pectins etc. are converted into low molecular compounds as a result of the chemical treatments, and these compounds remain in the purified and clarified juice. Another drawback is that the precipitate formed contains large amounts of inorganic materials which prevent an economical utilization of the valuable proteins contained in said precipitate. Thus, up to now the precipitates formed have been used as fertilizers only. Even for said purpose the precipitate is not fully acceptable because of the biodegradable nature of this product.

Finally, large amounts of chemicals have to be used to precipitate the proteins, pectins etc.

The object of the invention is to provide a more efficient process for the purification and clarification of sugar juices.

A further object of the invention is to separate from sugar juices proteins, pectins etc. which are uncontaminated with undesirable chemicals.

A still further object of the invention is to reduce the expenditures for precipitants.

SUMMARY OF THE INVENTION

The process according to the invention comprises the following steps:

(1) mechanically separating insoluble contaminating materials from the juice, e.g. by straining, filtration or centrifuging,
(2) subjecting the juice thus treated to an ultrafiltration with a semipermeable membrane permitting the passage of water and sugar molecules and preventing the passage of high molecular compounds,
(3) adding water to the concentrate and subjecting the diluted concentrate to a repeated ultrafiltration to remove the remaining sugar therefrom,
(4) repeating step 3, if desired,
(5) combining the permeate from steps 2, 3 and 4 and purifying the combined permeates by a process selected from the group consisting of a chemical treatment, a filtration, an ion exchange treatment, an electrodialysis, a reverse osmosis and combinations of two or more treatments.

When treating the juice in this manner the valuable proteins, pectins etc. are separated before the juice is subjected to the chemical purification and clarification. Thus, these organic materials are not converted into soluble compounds and the organic materials separated are not contaminated with chemicals. Therefore, the separated product has many applications, for example as a fodder. Due to the preliminary removal of proteins, pectins etc. the amount of precipitant required for obtaining an efficient purification and clarification is significantly reduced. Finally, since the chemical treatment of the proteins, pectins etc. is eliminated, the sugar juice prepared is of a higher purity than in the prior art methods. A further adavntage of the process of the invention is that colloids and waxes which are present in sugar cane juice and which may interfere with a final purification of the juice by reverse osmosis have been removed from the juice by the ultrafiltration steps. Thus, the purified juice prepared by the method of the invention can be subjected to a final purification by reverse osmosis before it is concentrated by evaporation and the sugar is separated by crystallization and recrystallization.

In case of sugar cane juice it is important that the temperature thereof is not raised to above 75° C. before the ultrafiltration because heat-treated juice may form wax coatings upon the membrane surfaces and consequently reduce the filtration capacity.

The concentrate from steps 3 and 4 is preferably dried either alone or in admixture with other organic materials. The product thus obtained is suitable as a fodder or fodder additive.

In a preferred embodiment of the process of the invention the pH value of the sugar juice is adjusted at a value of 6–11.5 before the first ultrafiltration by the addition of $CaO$, $Ca(OH)_2$ or $CaCO_3$. As a result of said treatment phosphates contained in the sugar juice are precipitated and are removed together with the concentrate.

When treating sugar cane juice the pH value is preferably adjusted at 6–8.5 whereas the pH value in case of sugar beet juice may be up to 11.5.

DESCRIPTION OF THE DRAWING

The process of the invention will now be described in further detail with reference to the drawing which shows a flow sheet of a preferred embodiment of the process of the invention.

DESCRIPTION OF THE PREFERRED EMBODIMENTS

Raw juice whether prepared from sugar beets or sugar cane is passed through a pipe 1 to a device 2 for mechnically separating insoluble contaminating materials from the juice. The separated materials are removed from the device 2 through a pipe 3 as a sludge. The juice subjected to said initial treatment is passed through a pipe 4 to a container 5 in which the pH value is adjusted at a proper value by addition of acid or base.

The juice passes from the container 5 through a pipe 6 to a first ultrafiltration apparatus 7. The concentrate formed in the ultrafiltration apparatus 7 is passed through a pipe 8 in which water is added before the juice is introduced into a second ultrafiltration apparatus 9. The concentrate formed in said second ultrafiltration apparatus 9 is passed to a drying apparatus 10 in which water is evaporated so as to form a dry protein-rich product.

The permeates from the first ultrafiltration apparatus 7 and the second ultrafiltration apparatus 9 are combined and subjected to a conventional purification and clarification in an apparatus 11.

The purified and clarified juice flowing out from the apparatus 11 has a higher purity and the juice obtained by the traditional chemical purification and clarification.

Example 1

A beet juice from which solid particles had been removed by straining was subjected to an ultrafiltration in an apparatus comprising a semipermeable membrane prepared from a solution consisting of:

| | Percent |
|---|---|
| Cellulose | 20 |
| Formamide | 39.5 |
| Acetone | 40.0 |
| Methyl cellulose | 0.5 |

The membrane was prepared by applying a thin layer of said solution onto a steel band and by drying said film for a period of 10 seconds before it was passed through an ice-water bath.

The ultrafiltration was carried out at a pressure of 20 atm. and the concentrate thus prepared was then diluted with an amount of water corresponding to 10% of the amount of juice being treated. This procedure was repeated twice. The concentrate obtained in this manner had a purity of 57.0%. The permeates were combined and the combined permeates had a purity of 93.6% compared to an initial purity of 89.4% of the starting material.

As a result of a subsequent ion exchange treatment the purity of the permeate rose to 96.7%. In a second run in which the permeate was subjected to a chemical treatment with 0.3% CaO and carbondioxide, the purity rose to 95.8%. The eluate obtained by the ion exchange treatment contained large amounts of organic acid and was suitable as a starting material for the production of for example citric acid. The sludge obtained as a precipitate in the chemical treatment was treated with $Na_2CO_3$-solution to liberate organic acids which can be used in the same manner as the eluate obtained by the ion exchange treatment.

The purification and clarification of raw juice with 1.0% CaO and carbon dioxide resulted in the obtaining of a juice having a purity of 92.8%.

The filtration coefficient of the juice which had been subjected to an ultrafiltration and a following chemical treatment was 0.5 compared to 3.8 for a juice obtained by the conventional purification and clarification.

The color of the juice which had been subjected to ultrafiltration and ion exchange treatment was 1.0° St., whereas the color of the juice subjected to ultrafiltration and following chemical treatment was 4.0° St. The color of the juice subjected to a conventional purification and clarification was 8.7° St.

As will appear from the above data the juice obtained by the ultrafiltration is more pure and easier to filter than the juice obtained by the conventional method. Furthermore, this treatment permits an economical utilization of the proteins. An electrodialysis can be used instead of the ion exchange treatment to obtain an additional purification following the ultrafiltration.

Example 2

A sugar cane juice which had been subjected to a mechanical pretreatment to separate insoluble contaminating materials was ultrafiltered in a double ultrafiltration unit having a total membrane surface area of 0.36 m.$^2$. The membranes used were cellulose acetate membranes. The average filtration capacity of said apparatus was 485 l./m.$^2$·24 hours. During the first ultrafiltration the volume of the concentrate was reduced to 4–6% of the original volume. Water was added so as to compensate for the water removed during the first ultrafiltration step, i.e. at a rate of 3–500 l./m.$^2$·24 hours. By adding water in amount of 10–15% of the original volume of juice, the concentration of sugar in the concentrate could be reduced to below 1% based on the total amount of sugar present in the juice used as starting material. Typical results obtained are as follows:

| | | |
|---|---|---|
| Volume of concentrate | percent | [1] 3 |
| Sugar content in concentrate | do | 3.5 |
| Total dry matter content of concentrate | do | 15–20 |
| pH value of permeate | | 5.4 |
| Average color index of filtrate | ° St | 4 |
| Ultrafiltration temperature | ° C | 25–35 |
| Ultrafiltration pressure | atm | 2–15 |
| Turbidity of filtrate | | 0.0 |

[1] Percent of volume of starting juice.

The combined permeates were treated with a $Ca(OH)_2$-solution to obtain a pH value of about 7 and was then heated to a temperature of about 100° C. The precipitate formed was separated by filtration and the purified juice was evaporated without further purification to form a crystallized sugar which subsequently was recrystallized.

Example 3

A sugar cane juice was pretreated as explained in Example 2. The pH value was then adjusted at about 7 and the juice was then subjected to the ultrafiltration disclosed in Example 2.

Typical results obtained were as follows:

| | |
|---|---|
| Ultrafiltration rate | 500 l./m.$^2$·24 hours. |
| Volume of concentrate | 3% of volume of starting juice. |
| Sugar content in concentrate | 3.0%. |
| Total dry matter content of concentrate | 15–20%. |
| pH value of filtrate | 7.1. |
| Color index of filtrate | 6° St. |
| Ultrafiltration temperature | 25–35° C. |
| Ultrafiltration pressure | 2–15 atm. |
| Turbidity of filtrate | 0.0. |

The clarified juice thus obtained was used for the production of white sugar without further purification.

I claim:
1. A process for the purification and clarification of sugar juice, comprising the steps of
   (1) mechanically separating insoluble contaminating materials from the juice,
   (2) subjecting the juice thus treated to an ultrafiltration with a semipermeable membrane permitting the passage of water and sugar molecules and preventing the passage of high molecular weight compounds,

(3) adding water to the concentrate and subjecting the concentrate to a repeated ultrafiltration to remove remaining sugar therefrom, (4) repeating step 3, if desired, (5) combining the permeates from steps 2, 3 and 4 and purifying the combined permeates.

2. A process as set forth in claim 1 wherein the concentrate from steps 3 and 4 is dried either alone or in admixture with other organic materials.

3. A process as set forth in claim 1 wherein said purification of combined permeates includes a filtration step.

4. A process as set forth in claim 1 wherein said purification of combined permeates includes a chemical treatment step.

5. A process as set forth in claim 1 wherein said purification of combined permeates includes an ion exchange treatment step.

6. A process as set forth in claim 1 wherein said purification of combined permeates includes an electrodialysis step.

7. A process as set forth in claim 1 wherein said purification of combined permeates includes a reverse osmosis step.

8. A process for the purification and clarification of sugar juice comprising the steps of (1) mechanically separating insoluble contaminating materials from the juice, (2) adjusting the pH value of the juice at 6–11.5 by the addition of $Ca(OH)_2$, $CaO$ or $CaCO_3$, (3) subjecting the juice thus treated to an ultrafiltration with a semipermeable membrane permitting the passage of water and sugar molecules and preventing the passage of high molecular weight compounds, (4) adding water to the concentrate and subjecting the concentrate to a repeated ultrafiltration to remove remaining sugar therefrom, (5) repeating step 4, if desired, and (6) combining the permeates from steps 3, 4 and 5 and purifying the combined permeates.

9. A process as set forth in claim 8 wherein the concentrate from steps 4 and 5 is dried either alone or in admixture with other organic materials.

10. A process as set forth in claim 8 wherein said purification of combined permeates includes a filtration step.

11. A process as set forth in claim 8 wherein said purification of combined permeates includes a chemical treatment step.

12. process as set forth in claim 8 wherein said purification of combined permeates includes an ion exchange treatment step.

13. A process as set forth in claim 8 wherein said purification of combined permeates includes an electrodialysis step.

14. A process as set forth in claim 8 wherein said purification of combined permeates includes a reverse osmosis step.

References Cited
UNITED STATES PATENTS

| | | | |
|---|---|---|---|
| 3,228,876 | 1/1966 | Mahon | 127—40 X |
| 3,668,007 | 6/1972 | Egger | 127—54 X |

MORRIS O. WOLK, Primary Examiner

S. MARANTZ, Assistant Examiner

U.S. Cl. X.R.

127—46 R, 48; 210—22; 204—180 P